US009485460B2

(12) United States Patent
McCullough

(10) Patent No.: US 9,485,460 B2
(45) Date of Patent: Nov. 1, 2016

(54) COLLABORATION SYSTEM

(71) Applicant: Tracer McCullough, San Diego, CA (US)

(72) Inventor: Tracer McCullough, San Diego, CA (US)

(*) Notice: Subject to any disclaimer, the term of this patent is extended or adjusted under 35 U.S.C. 154(b) by 244 days.

(21) Appl. No.: 14/498,899

(22) Filed: Sep. 26, 2014

(65) Prior Publication Data

US 2015/0092116 A1    Apr. 2, 2015

Related U.S. Application Data

(60) Provisional application No. 61/883,888, filed on Sep. 27, 2013.

(51) Int. Cl.
*H04N 5/64* (2006.01)
*H04N 7/14* (2006.01)
*H04N 7/15* (2006.01)

(52) U.S. Cl.
CPC .............. *H04N 7/142* (2013.01); *H04N 7/147* (2013.01); *H04N 7/15* (2013.01)

(58) Field of Classification Search
CPC ............. H04N 5/64; H04N 7/14; H04N 7/15
USPC .................. 348/838, 840, 836, 843; 386/200
See application file for complete search history.

(56) References Cited

U.S. PATENT DOCUMENTS

| 5,803,562 | A | 9/1998 | Jacobs |
| 6,443,543 | B1* | 9/2002 | Chiang .................. A47B 21/00 180/65.1 |
| 7,832,694 | B2 | 11/2010 | German |
| 2005/0110461 | A1 | 5/2005 | McConnell |
| 2008/0116327 | A1 | 5/2008 | Goldberg |

OTHER PUBLICATIONS

Coalesse Conferencing and Storage Specification Guides, Exponents Design Coalesse Design Studio, Aug. 2013.

* cited by examiner

*Primary Examiner* — Robert Chevalier
(74) *Attorney, Agent, or Firm* — Matthew C. McCartney, Esq.; Eastman & McCartney LLP

(57) ABSTRACT

The improved collaboration system of the present invention is a high tech mobile conference room packaged in a low-cost, compact, and mobile unit to help users better collaborate, communicate, and increase productivity. The system allows multiple users to concurrently connect their personal electronic devices to the system wirelessly, through a hard connection, or across the internet to utilize the attached high definition monitor display. Integrated technology allows multiple users to be displayed simultaneously on the monitor display, eliminating the need for users to present in a linear fashion, one after the other. Attached whiteboards promotes active participation and collaboration by allowing users to convey their thoughts immediately. An attached pull-out conference table provides a large surface area to conduct meetings, presentations, and hold conferences. A self-contained rechargeable power system removes the need to be constantly connected to the power grid and allows the system to be used anywhere, any time.

1 Claim, 9 Drawing Sheets

COLLABORATION SYSTEM

RELATED APPLICATION

The present application claims the benefit of priority to U.S. Provisional Patent Application Ser. No. 61/883,888 filed Sep. 27, 2013, and currently co-pending.

FIELD OF INVENTION

The present invention relates generally to workstations. The present invention is more particularly, though not exclusively, related to a mobile collaboration system which integrates different types of technology into a single mobile workstation to enable multiple users to interact and collaborate.

BACKGROUND OF THE INVENTION

In any collaborative work environment, white boards serve as an invaluable tool which can be used by participants to enhance communication, understanding and responsiveness. A whiteboard allows individual participants to share ideas instantaneously by writing their thoughts onto the whiteboard for review and immediate feedback by participants. The participants may then share their responses on the white board, promoting conversation and dialogue resulting in a more efficient and complete exchange of ideas. With advancements in technology, the concept of traditional whiteboards has been expanded to take advantage of our modern digital age.

Electronic whiteboards provide users with an interactive touch screen upon which a variety of functions may be performed such as to display a computer screen, to show videos, to create text, to take notes, and to act as a presentation aid. Projectors allow multiple viewers to view videos, presentations, and documents at once. Personal computing devices such as laptops, computer tablets, and smartphones allow users to instantaneously share information with one another through electronic networks. With a variety of different technologies and personal computing devices, it has been a challenge to create the correct synergy between those technologies and devices to create a truly collaborative workspace.

In typical work environments, projectors and whiteboards (both traditional and electronic) are stationary and located within a conference or meeting room. Often times the conference or meeting rooms are used without utilizing the available technology within the room and without using any personal computing devices. As a result, it can be difficult or impossible for every worker to have access to such technology. This decreases the efficiency and cost-effectiveness of the workers and the technology. To combat the problem, companies may be forced to obtain additional office space and purchase and install whiteboards, projectors and associated hardware to meet company needs. Additionally, in typical work environments, only a single person can be presenting at any one time. The projectors and electronic whiteboards are limited to displaying only one connected device. As a result, when a presenter takes the podium in those typical work environments, the audience can only passively observe.

In light of the above, it would be advantageous to provide an improved collaboration system which has the ability to provide a mobile conference room utilizing all of the latest collaborative technology in a low-cost, compact, and mobile unit. It would be further advantageous to provide an improved collaboration system in which multiple users may utilize a single display simultaneously, creating a platform where users may interact with one another. It would further be advantageous to provide an improved collaboration system in which users may connect wirelessly, through a hard connection, or across the internet. It would further be advantageous to provide an improved collaboration system in which the collaboration technology is easily replaceable. It would further be advantageous to provide a collaboration station which is powered by a self-contained rechargeable power system, removing the need to be constantly connected to the power grid. Furthermore, it would be advantageous to provide a collaboration station which incorporates a concealable pull-out conference table. It would be further advantageous to provide an improved collaboration system having the ability to attach multiple types of displays and interactive surfaces.

SUMMARY OF THE INVENTION

The improved collaboration system is an integrated solution for work environments lacking the technology, additional real estate space, and additional IT staff to support a technologically advanced conference room. The improved collaboration system is mobile and may be transported into any room and converted into a conference room, meeting room, or project room. Accordingly, the need for multiple audio/video systems is reduced as the improved collaboration system integrates technologically advanced hardware into a single unit which may be used anywhere and at any time. The integrated technology allows users to easily connect to the system without the need for specialized knowledge or the help of IT staff. The valuable time of workers are no longer wasted on jockeying for conference rooms and on figuring out how to use the technology and is instead spent on producing real results.

The improved collaboration system allows the users to better interact with one another, creating a more intimate and engaging workplace. The improved collaboration allows multiple users to connect to the improved collaboration system simultaneously. Also, the improved collaboration system provides several users the ability to utilize a high definition monitor display and easily share the digital content they have created. Users utilizing the display may switch between each user by simply pressing a button. Users may also utilize attached physical whiteboards to react and respond immediately to content verbally communicated or digitally displayed, thereby enhancing spontaneity and creativity during collaborative meetings. The improved collaboration system promotes and enhances workplace productivity by providing workers a system to collaborate and share ideas.

The improved collaboration system of the present invention relates to a mobile collaboration system which integrates different types of technology into a single mobile workstation to enable users to interact and collaborate. The improved collaboration system provides a mobile conference room utilizing all of the latest collaborative technology in a low-cost, compact, and mobile unit. The improved collaboration system allows multiple users to connect to the system wirelessly, through a hard connection, or across the internet in order to utilize an attached high definition monitor display. The integrated technology allows multiple users to be displayed simultaneously on the monitor display. The improved collaboration system is powered by a self-contained rechargeable power system, removing the need to be constantly connected to a power grid. Additionally, the improved collaboration system incorporates a concealable pull-out conference table to allow multiple users to have all the amenities of a technologically advanced conference room. The system is flexible to allow integrated technology to be replaced. The system is low-cost, mobile, and compact. Additionally, the system is configurable to allow multiple collaboration systems to be used conjunctively.

More particularly, the improved collaboration system of the present invention includes a display assembly and technology assembly. The display assembly is attached and supported to the top of the technology assembly to create a single unit. The display assembly is narrower in depth than the technology assembly and is placed flush towards the back of the technology assembly, providing a useable surface area in the front of the technology assembly.

The display assembly is of a boxlike construction consisting of front, rear, left, right, top, and bottom walls. The front wall of the display assembly comprises a display support panel in which a monitor display is attached. On the rear of the display assembly is another large surface area with the same dimensions as the front. The rear may also be utilized for the same purposes as the front. On the left and right walls of the display assembly, extending panels are recessed within the display assembly. The panels may be pulled out to be used or pushed in to be concealed. Access panels on the left and right wall of the display assembly allow access to the interior of the display assembly for maintenance and repair. Additionally, the routing channels for wires and cables are disposed within the interior of the display assembly at predetermined areas. Along the top of back wall of the display assembly there are means, such as pegs or clips, in which items may be attached.

The technology assembly is of boxlike construction as well. The front wall comprises the technology docking and storage area access panel and partition one of the pull-out conference table.

The technology docking and storage area has three compartments: a power station, storage compartment, and technology docking station. The technology docking and storage area is accessible by a pivoting access panel. The technology docking station houses the technology which allows users to interface their personal electronic devices with the improved collaboration system through wireless connection, internet connection, or by hard wire connection. Through the use of the cable routing channels and the integrated wiring within, technology is connected to the monitor display of the display assembly. This allows users connected to the technology to use the display for presentations and meetings. Additionally, the technology docking station allows for easy swapping from one form of technology to another when needed. The technology allows multiple users to be connected to the improved collaboration system simultaneously. The users may utilize the monitor display to present to their peers and their peers may also respond by utilizing the monitor concurrently. This allows the users to spend more time interacting with one another and less time interacting with technology.

Immediately below the technology docking and storage area, is a concealable pull-out conference table hidden within the technology assembly. The full table is divided into two partitions, partition one and partition two. Partition one and partition two is hingedly connected together, allowing partition one to pivot to an open and a closed position. Partition one has two collapsible legs to enable partition one to be supported in the open position when the legs are extended and to the closed position when the legs are collapsed.

Partition two is connected to the technology assembly through the use of sliding rails. A support member is connected to the bottom of partition two. The support member gives partition two, and in turn the table, the structural support needed to support the weight of the improved collaboration station, the weight of the table and any potential items put on top. When the conference table is not in use, partition two may be pushed inside of the technology assembly to become hidden and partition one may be pivoted at the hinge downward to the closed position to create a flush surface in the front of the technology center.

On the right wall of the technology assembly, there are two drawers and a side access door to the technology docking station. On the left wall is the storage area for the self-contained rechargeable power system. The power system enables the improved collaboration system to be independent of an electrical wall socket for several hours. The power system allows the improved collaboration system to be used in areas where no electricity is readily available and thus enables the improved collaboration system to be fully portable. However, the area used to store the power system may be used as a storage cabinet when a user chooses not to have mobile power. On the rear of the technology center is an access door to the interior of the technology assembly. The door allows access to the drawers as well as to the routing channels for wires and connectors for the technology used by the system. Power and network connectors are located on the lower rear corner of the technology assembly. The power and network connectors are connection points and thus do not have protruding wires to interfere with transportation or storage.

On the bottom of the technology assembly, are heavy duty locking wheels. The wheels allow the improved collaboration system to be mobile. Additionally, the support member also has a wheel connected to provide support when the improved collaboration system is being transported. The design of the improved collaboration system allows multiple improved collaboration systems to be used in cooperation to create larger collaboration systems.

BRIEF DESCRIPTION OF DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE INVENTION

Figure 1:
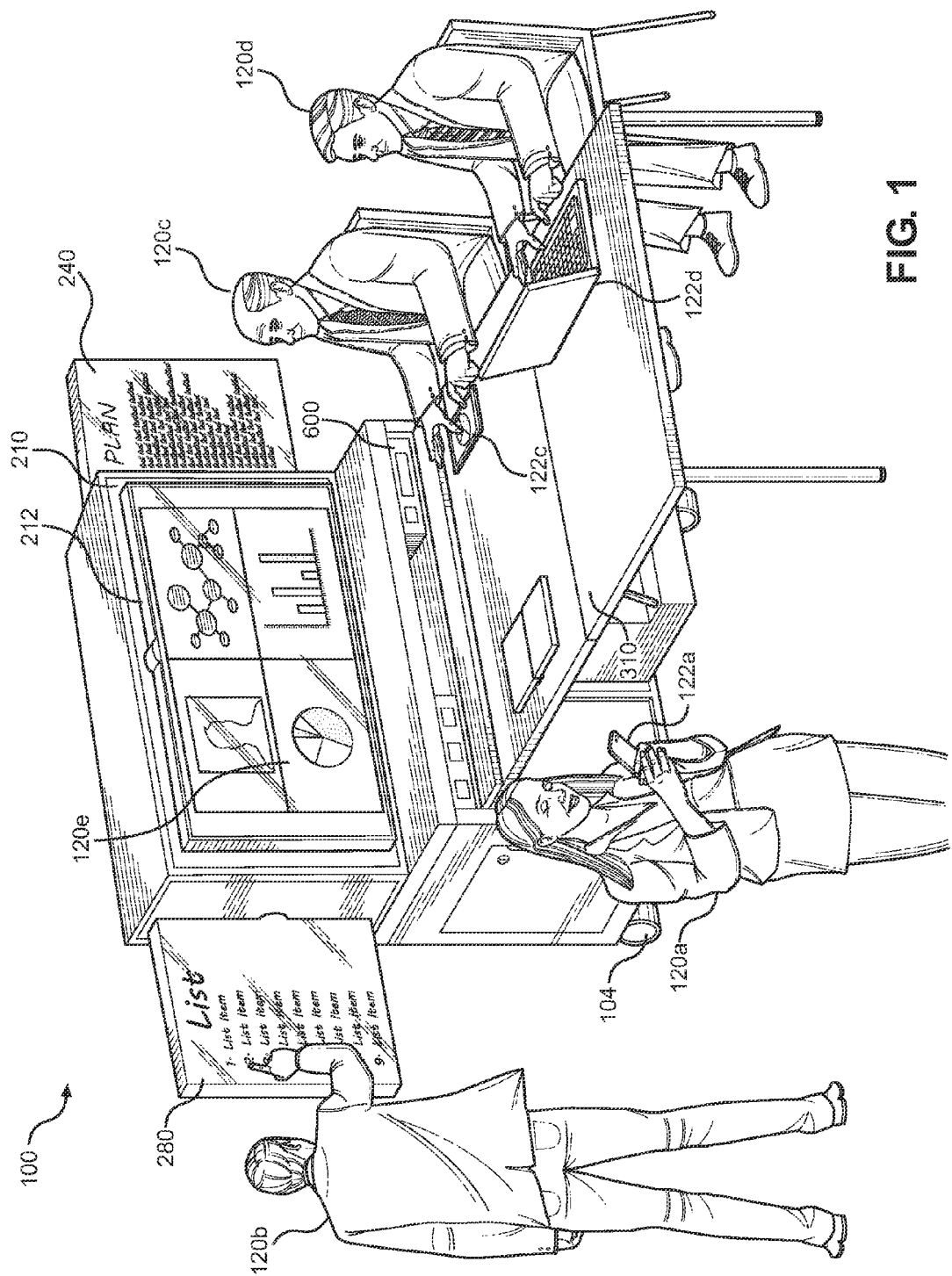
FIG. 1 is a plan view of the preferred embodiment of the present invention, the improved collaboration system being utilized by several users conducting a collaborative meeting in a large empty office in which all users are connected to the improved collaboration system and their personal electronic devices displayed on the monitor.

Referring initially to FIG. 1, the preferred embodiment of the present invention, the improved collaboration system 100 is shown being utilized by several users 120 in a large office space without any office equipment. By utilizing the improved collaboration system 100, a number of users 120 (collectively 120a, 120b, 120c, 120d and 120e) have a self-contained high tech mobile office workstation. As shown, the improved collaboration system 100 has a high definition monitor display 212 along with the technology 600 to enable multiple users 120 to wirelessly connect to the high definition monitor display 212 and to the internet. The improved collaboration system 100 also has a display panel 210 utilized as a whiteboard in the present embodiment, extendable display panels 240 and 280 utilized as whiteboards and a large pull-out conference table 310.

The improved collaboration system 100 provides the users 120 with all of the technology required to hold a collaborative meeting anywhere at any time. A set of heavy duty locking wheels 104 provide mobility to the improved collaboration system 100 and a self-contained rechargeable power system 610 (shown in FIGS. 3 and 9) removes the need for the improved collaboration system 100 to be connected to an electric wall socket. Once the improved collaboration system 100 is located in the area in which it is to be used, the heavy duty locking wheels 104 may be locked to prevent further movement and the self-contained rechargeable power system 610 may be left unplugged to provide power straight from its batteries or plugged into an electrical wall socket to provide power from the grid. As a result, the improved collaboration system 100 may be moved to and used in office spaces, warehouses, and conference rooms where no electrical outlet is available.

In FIG. 1, the users 120 are utilizing the improved collaboration system 100 and collaborating together on a project where every participant is actively engaged with one another through use of the improved collaboration system 100. The extendable display panels 240 and 280 are in the extended position providing additional surface area for written material apart from display panel 210. User 120b is standing in front of extendable display panel 280 giving a presentation to users 120a, 120c, 120d and 120e. Users 120c and 120d are sitting around pull-out conference table 310 actively participating while user 120e is participating through video-conferencing. User 120c is connected wirelessly to technology 600 and displaying the research results on his tablet 122c on the high definition monitor display 212. Concurrently, user 120d is wirelessly connected to the high definition monitor display 212 with his laptop 122d and displaying his results of the research. User 120a is wirelessly connected to the technology 600 with his smartphone 122a. However user 120a is away from the pull-out conference table 310, and as a result, his presentation has ceased to appear on the high definition monitor display 212. The improved collaboration system 100 of the present invention allows users to spend more time collaborating with each other and less time setting up and integrating with technology.

Figure 2:
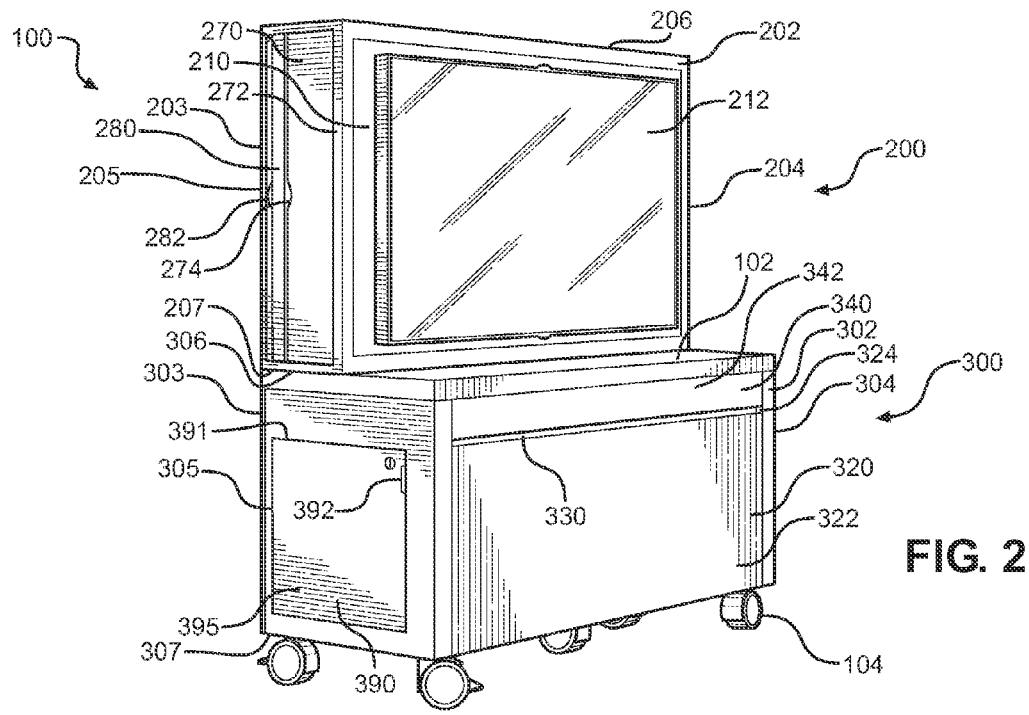
FIG. 2 is a front isometric view of the improved collaboration system of the present invention comprising a display assembly and technology assembly illustrating a right and left display panel concealed within the confines of the display assembly and a table concealed within the interior of the technology assembly with heavy duty locking wheels mounted on the underside of the display assembly at each of the four corners.

Referring now to FIG. 2, an isometric view of the improved collaboration system of the present invention is shown and generally designated 100. FIG. 2 illustrates the improved collaboration system 100 in a closed mobile condition for transport. As shown in FIG. 2, the improved collaboration system of the present invention 100 is comprised of two major components, the display assembly 200 and the technology assembly 300.

The display assembly 200 comprises generally parallel and vertically extending right 204 and left 205 side walls which are rigidly and perpendicularly joined to a generally vertically enlarged front wall 202 and rear wall 203 creating an open box with equal vertical walls. The top 206 and bottom 207 are rigidly connected to the open box to form a closed box. The technology assembly 300 is of boxlike construction and comprises a boxed frame with a front wall 302, rear wall 303, right wall 304, left well 305, top wall 306 and bottom wall 307 as well. The walls are joined together, in the same manner as display assembly 200, to create technology assembly 300. As illustrated, the walls of display assembly 200 and technology assembly 300 are smooth and sleek surface with no protruding hardware.

The display assembly 200 is located above and adjacent to the technology assembly 300 with a high definition display monitor 212 attached to display assembly 200 by any means known in the art, at eye level of a user. The display assembly 200 is oriented adjacent to the top of technology assembly 300 such that the bottom wall 207 of display assembly 200 is in contact with the top wall 306 of the technology assembly 300 and the right walls 202 and 302, left walls 205 and 305, and rear walls 203 and 303 are in the same planar field, respectively. The depth of the display assembly 200 is smaller than the technology assembly 300, resulting in a stationary work area 102 towards the front of the display assembly 200. Located on the underside of technology assembly 300 are four (4) heavy duty locking wheels 104 attached to the bottom wall 307. Each heavy duty locking wheel 104 is located at a corner of the bottom wall 307 of the technology assembly 300 to provide the mobility to transport the improved collaboration system 100 anywhere it is needed.

The front wall 202 of the display assembly 200 provides a frame in which display panel 210 is inserted and attached. The display panel 210 can be made of various materials able to provide a strong, durable and stable structure in which to support the weight of the high definition monitor display 212. In this preferred embodiment, in order to provide additional utility and cost-effectiveness, a whiteboard structure is used for display panel 210. This allows users to use the area of display panel 210 not covered by the high definition display monitor 212 as a writing surface.

The left wall 205 of the display assembly 200 comprises a left side access panel 270, and an extendable display panel 280. The left side access panel 270 is attached to the left wall 205, which acts as a support frame, by hinges 272 which allow pivoting. The left side access panel 270 rotates along the vertical axis created by hinges 272 from a closed position, which is substantially parallel to the left wall 205 to the open position which is at an angle greater than 90 degrees to the left wall 205. A notched segment 274 in the left side access panel 270 allows users to easily open the panel without the need for protruding hardware. Located next to the left side access panel 270 is the extendable display panel 280. The extendable display panel 280 is attached to the display assembly 200 with linear slides allowing the display panel 280 to move linearly along a straight line into or out of the display assembly 200. A notch 282 in the frame 220 allows the user to easily grasp the display panel 280.

Comprising the front wall 302 of the technology assembly 300 is a top surface 322 of partition one 320 of pull-out conference table 310. As shown in FIG. 2, partition one 320 is in its closed, substantially vertical, downward position, allowing the top surface 322 of partition one 320 to sit flush with the front wall 302 of technology assembly 300. Partition one 320 is connected by a table hinge 324 to a partition two 330 of the pull-out conference table 310. The table hinge 324 defines a horizontal hinge axis which permits partition one 320 to pivot from a substantially horizontal open position which projects normal to the front wall 302 of the technology assembly 300, to a substantially vertical closed position oriented parallel to the front wall 302 of the technology assembly 300. Partition two 330 is recessed into a cavity of display assembly 300 in which it is substantially normal to the front wall 302.

Figure 3:
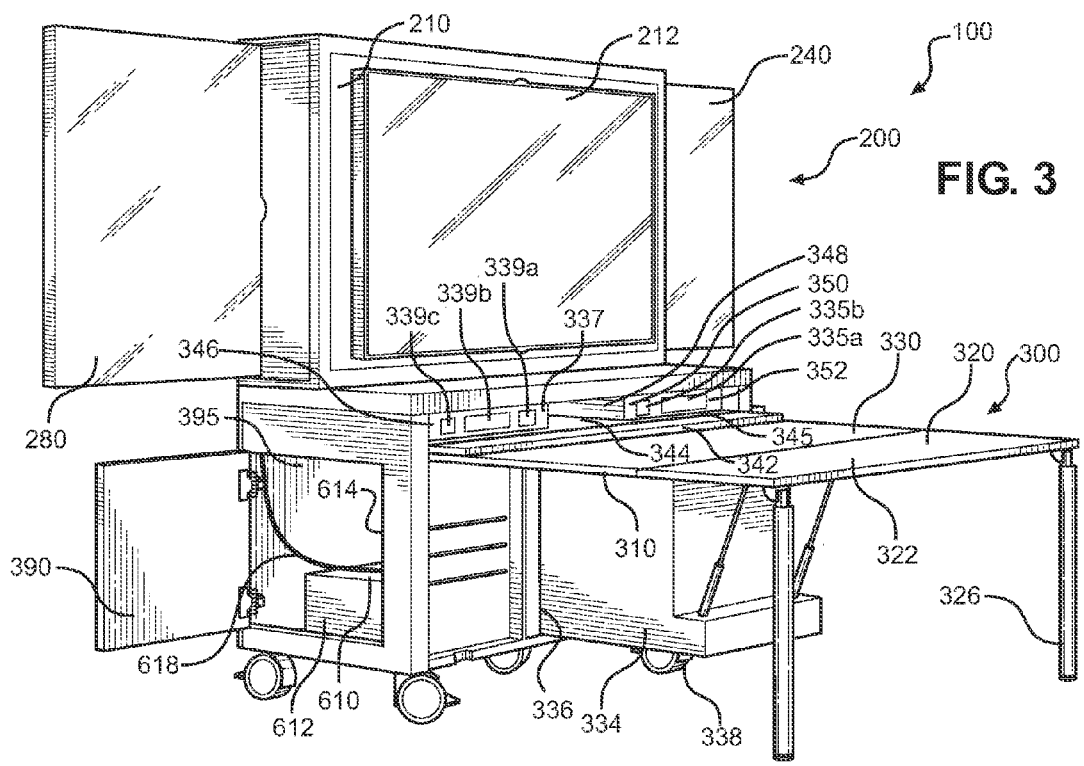
FIG. 3 is an isometric view of the improved collaboration station showing the improved collaboration system in the open position with the conference table extended for use, both side panels extended, and a display monitor.

Located above partition two 330 is a front access panel 342 to allow access to a technology dock and storage area 340 (show in FIG. 3). A front access panel 342 encloses the front of the technology dock and storage area 340 and is hingedly connected by a hinge front access panel hinge 345 to the technology dock and storage area lower wall 344. The front access panel hinge 345 (shown in FIG. 3) creates a horizontal axis of rotation, allowing the front access panel 342 to pivot to a close and open position. When closed, the front access panel 342 sits flush with front wall 302.

Comprising the left wall 305 of the technology assembly 300 is a left side access door 390. The left side access door 390 is hingedly connected to the left wall 305 by a left side access door hinge 391, providing a vertical axis along the hinge in which the door is able to pivot. The left side access door 390 has a notch 392 which allows a user to easily open the left side access door 390 to an open position.

Referring now to FIG. 3, the improved collaboration system 100 in an open condition for use as a technologically advanced conference room is shown. The display assembly 200 has both left and right extendable display panels 240 and 280 extended in the open position for use. In the preferred embodiment, the extendable display panels 240 and 280 are whiteboards to allow users to write on the surface however, it is appreciated by those skilled in the art that the display panels may be made from alternative materials. Alternatively, the panels may be additional monitor displays.

When in the open position, the left side access door 390 allows access to a cavity 395 of the technology assembly 300. In this preferred embodiment, the cavity 395 is used as the storage area for the self-contained rechargeable power system 610 comprising a power inverter 612 and a battery 614.

The self-contained rechargeable power system comprises a power inverter 612, batteries 614, a battery status monitor 616 (shown in FIG. 3), and battery connectivity cables 618. The self-contained rechargeable power system 610 provides power to the technology docking station 350, the power station compartment 346, and to the high definition display monitor 212 through the use of internal power cables running through the cable routing channel 396. The power inverter 612 provides power to connected devices by drawing its power needs from the integrated battery 614 or directly from the electrical wall outlet.

The power inverter 612 charges the battery 614 when the charge is low, assuring the battery 614 will be fully charge and able to provide the power needed when an electrical outlet is unavailable. It is obvious to those skilled in the art that a variety of batteries are available that can provide a variety of different power outputs. In the preferred embodiment, the battery 614 can provide up to 100 Ah which will power the improved collaboration system for approximately 5 hours. The self-contained rechargeable power system 610 is connected to the power and network connector panel 386. The power inverter 612 of the rechargeable power system 610 receives power from the electric power grid to recharge the battery or provide grid power to the system through the power and network connector panel 386. By plugging one end of a power cable into an electric wall socket and the other end to the power and network connector panel 386, a connection between the electric power grid and rechargeable power system 610 is made.

The self-contained rechargeable power system 610 allows the improved collaboration system 100 to be truly mobile, removing the need to be connected to an electric wall socket for its power needs for an extended period of time.

Alternatively, the cavity 395 may be used as additional storage area, removing the self-contained rechargeable power system 610. By removing the self-contained rechargeable power system 610, users have the option of choosing a cheaper alternative option when they do not need the improved collaboration system 100 to be independent of an electrical socket, such as when the improved collaboration system 100 will be used primarily in an office building which has electrical sockets throughout the building.

The front access panel 342 is pivoted downward along the axis of front access panel hinge 345 revealing the technology docking and storage area 340. The technology and dock storage area 340 is a boxlike structure comprising a predetermined portion of the technology assembly 300, partitioned by a technology dock and storage area lower wall 344. The technology docking and storage area 340 is partitioned into three compartments: power station compartment 346, storage area compartment 348, and technology docking station compartment 350. The technology docking station 350 houses the technology 600 which interfaces users to the improved collaboration system 100. Users may connect their personal electronic devices (such as a laptop, tablet, or smartphone) to the technology 600 either through wireless connection, internet connection, or hard wire connection. Once connected to the technology 600, the user has the ability to control the high definition monitor display 212 and display what is showing on their personal electronic device. Technology 600 allows multiple users to be displayed simultaneously on the high definition monitor display 212 and allows even more users to be connected to the improved collaboration system 100 at once. This allows users to switch back and forth without waiting for the previous user to disconnect, eliminating the need to waste valuable time.

The power station compartment 346 allows users to connect external technology or equipment requiring power to the self-contained rechargeable power system 610 of the improved collaboration system 100. The storage area 348 is located in-between the power station 346 and technology docking station 350. The storage area 348 allows items to be placed within the cavity when not needed. Additionally, the technology docking station 350 and power station 346 are recessed with enough clearance from the front access panel 342 to allow the power wires of external electronic devices connected to either station to travel into the storage area 348. Therefore, personal electronic devices plugged into connectivity panel 352 or power panel 337 may be stored in the storage area 348 and concealed by the front access panel 342.

As illustrated, the open condition of the improved collaboration system 100 for use as a technologically advanced conference room has a full sized pull-out conference table 310. Pull-out conference table 310 comprises partition one 320 hingedly attached to partition two 330. The hinge 324 permits partition one 320 to pivot from a substantially vertical closed position oriented parallel to the front wall 302 of the technology assembly 300 to a substantially horizontal open position which projects normal to the front wall 302 as shown.

A pair of support legs 326 are mounted to the underside of partition one 320 to support partition one 320 in the open position. The support legs 326 are preferably cylindrical members, with each member having an upper end fixedly attached to the underside of the table by means which allow them to be pivoted along a single axis. The support legs 326 can be held in an open and closed position. The open position has the legs normal to partition one 320 to enable support and the closed position orients the legs perpendicular and in contact with the underside of partition one 320. Once collapsed in the closed position, the technology assembly 300 provides enough clearance space for both the legs 326 and the thickness of partition one 320 to be tucked within technology assembly 300 to create a flush exterior surface.

Partition two 330 of the pull-out conference table 310 is in the open position. Partition two 330 is supported in place by a support member 334. The support member 334 is attached to the underside of partition two 330. The support member 334 is attached to the technology assembly at each of the four corners by slide rails 336 disposed substantially horizontally and normal to front and rear walls 302 and 303. The four slide rails 336 confines the movement of support member 334 in a direction normal to the front 302 and rear walls 303. The conference table 310 gives users a large work surface to conduct meetings, conferences, and presentations. If a smaller table is required, partition two 330 may be pushed into its recess within technology assembly 300 and only partition one 320 used.

Attached to the underside of the support member 334 is a single heavy duty locking wheel 338 which contacts a base floor. The wheel 338 is proximately located in the center of the underside of support member 334 and provides the support for the table 310 and the improved collaboration system 100. When the table is in the closed mobile condition as shown in FIG. 1, the weight of the entire improved collaboration system 100 is concentrated directly beneath the footprint of the system and on the five wheels 104 and 338. When fully extended, the weight of the improved collaboration system 100 is distributed along a larger footprint. The weight of the system is spread to the four wheels 104 of the technology assembly 300 located directly beneath the improved collaboration system 100, support member wheel 338 located outside of the technology assembly, and partition one legs 326. This spreads out the weight over a larger surface area, thereby making the system more stable. Support member 334 ensures that the additional weight placed on the table top does not affect the stability of the improved collaboration system 100 by providing an additional point of contact for the table.

Figure 4:
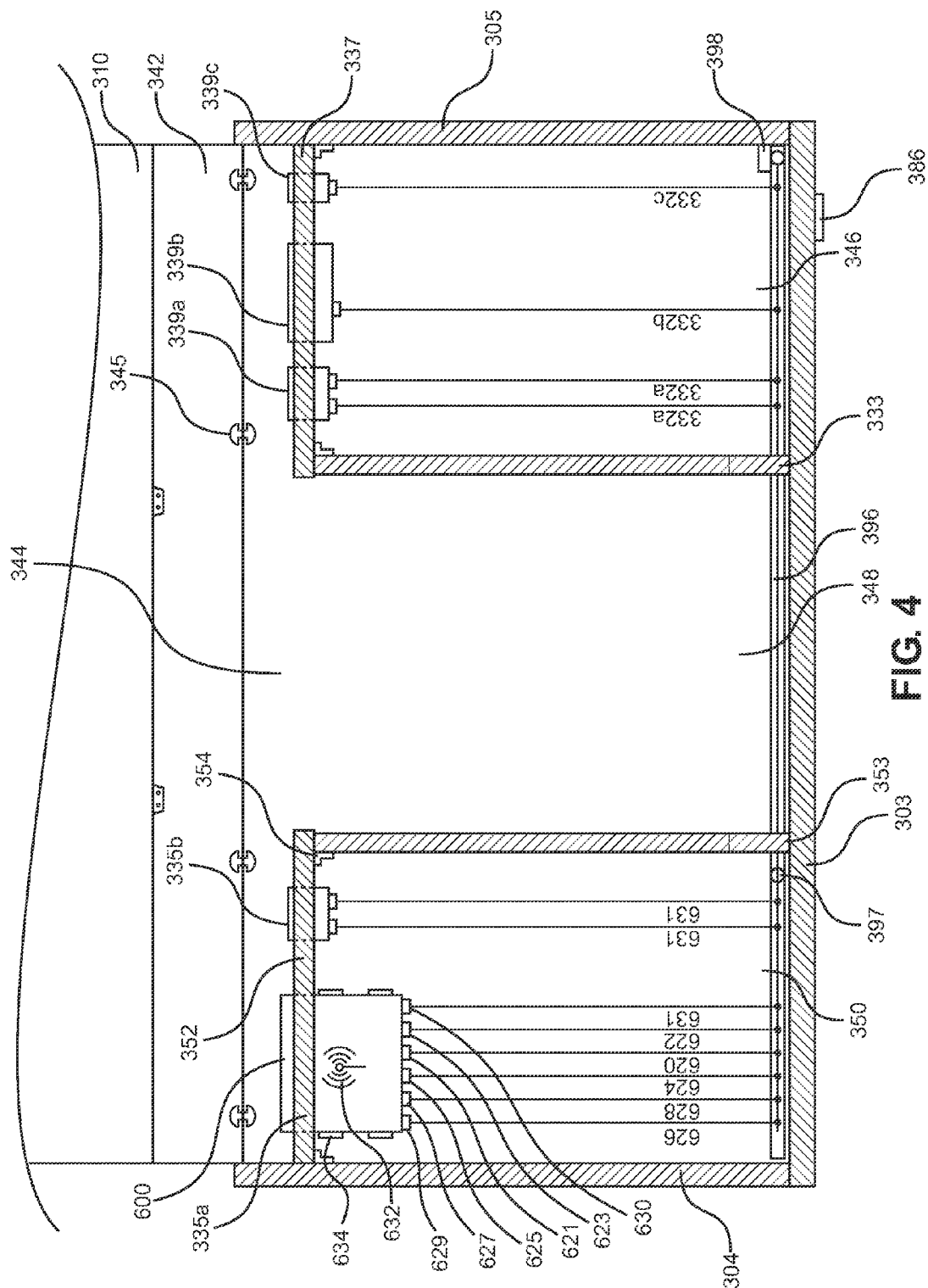
FIG. 4 is a cross sectional view of the internal top view of technology docking and storage area of the improved collaboration system of the present invention showing the technology docking station, power station and storage area.

Referring now to FIG. 4, is a cross sectional view of the technology assembly 300 taken at cross section I-1 of FIG. 3 showing the interior plan view of technology docking and storage area 340. The power station compartment 346, the storage area compartment 348, and the technology docking station compartment 350 comprises the technology docking and storage area 340. The cable routing channel 396 is located towards the rear of the technology docking and storage area 340 to accommodate the compact structure of the improved collaboration system 100.

The cable routing channel 396 is located along the technology docking and storage area 340 due to the location being substantially the center of the improved collaboration station 100. This allows all internal cable and wires to join at a central location and allows easy access to the interior of display assembly 200 and technology assembly 300. The cable routing channel 396 starts from the technology docking station compartment 350 and enters into the storage area compartment 348 through a side access port 353 on the wall of the technology docking station compartment 350. The cable routing channel 396 enters from the storage area compartment 348 into the power station compartment 346 through a side access port 333 on the wall of the power station compartment 346.

The cable routing channel 396 enters the display assembly 200 through an upper routing port 397 and enters the bottom interior of the technology assembly 300 through a lower routing port 398. The upper routing port 397 is an opening through the display assembly 200 and the technology assembly located in the technology docking station 350. The upper routing port 397 provides the shortest path from the technology docking station 350 to the display assembly 200. The lower routing port 398 is an opening through the technology dock and storage area lower wall 344, located at the intersection of the rear wall 303 and left wall 305, giving access to the bottom interior of the technology assembly 300. The lower routing port 398 is the shortest path from the power station compartment 346 and the cavity 395 used as the storage area for the self-contained rechargeable power system 610 comprising a power inverter 612 and a battery 614.

By utilizing the shortest paths, the lengths of wiring and cable used are minimized and the area needed to run the cables are minimized as well.

The location of the cable routing channel 396 allows the size of pull-out conference table 310 and support member 334 to be maximized. The cable routing channel 396 does not occupy the bottom portion of the technology assembly 300, allowing the pull-out conference table 310 to span the entire bottom interior of the technology assembly 300. Additionally, locating the lower routing port 398 at the intersection of the walls keeps the cable routing channel 396 from obstructing the path of the pull-out conference table 310 and support member 334. The compactness of the cable routing channel 396 removes the need for large amounts of space for cables and wiring, allowing the space to be utilized to accommodate the pull-out conference table 310 and support member 334 in the closed position.

As illustrated, cable routing channel 396 is shown and all internal wiring and cables including audio, video, power, network, and USB is represented by a single straight line. A network cable integrated into cable routing channels 396 has an integrated Ethernet hub connected to allow multiple pieces of equipment to utilize the Ethernet port of the power and network connector 386. The cable routing channel 396 allows easy connectivity between the technology 600, monitors, network connections, power connections and other integrated equipment.

The technology docking station compartment 350 has technology 600 and connectivity panel 352 in place. The technology docking station 350 is covered by a removable connectivity panel 352. The connectivity panel 352 is attached to the technology docking station 350 by a clip 354, or other means which allows easy removal such as latches or fasteners. The connectivity panel 352 houses a technology display port 335a and a connectivity port 335b. In a preferred embodiment, technology display port 335a is a rectangular opening in the connectivity panel 352 with a predetermined size based on a front display panel of technology 600. Through the technology display port 335a the front display panel of technology 600 is shown. The technology display port 335a allows users to see the status of technology 600.

Connectivity port 335b comprises dual sided connectors with an external end oriented to the exterior of technology docking station 350 and an interior end oriented towards the interior of technology docking station 350. The interior end of the connectivity port 335b is connected to the technology 600 by a cable or wire. The external end of connectivity port 335b is exposed to allow users to connect to technology 600 through a hard wire if their device is not wireless (Wi-Fi) capable. Additionally, the connectivity port 335b has a power connector connected to the internal power cables, allowing external electronic devices access to power. Connectivity port 335b provides conventional and USB power connectors connected to the internal power cables by power cable 631, allowing external electronic devices not integrated to the improved collaboration system 100 access to power. The use of connectors in both the connectivity panel 352 and technology 600 enables the technology 600 to be easily disengaged from the improved collaboration system 100.

The technology 600 has connectors for HDMI 621, audio 623, VGA 625, Ethernet 627, a USB service port 629, and a power connector 630. The technology 600 is connected to the monitor display 212 through the use of HDMI cables 620 or VGA cables 624 already integrated and wired into the improved collaboration system 100. An audio cable 622 is also prewired in the improved collaboration system 100 and can connect the audio output 621 to built-in speakers in the monitor display 212. The technology 600 is able to display full HD 1080P resolution using the HDMI output 621 and UXGA display resolutions using the VGA output 625.

The internal wireless antenna 632 enables the technology to wirelessly connect to existing personal wireless networks and also allows users to wirelessly connect to the technology 600. The Ethernet port 627 allows the technology 600 to be connected by hard wire to a network that does not have wireless capabilities. A cat5e cable 628 is connected to Ethernet Port 627 which is connected to power and network connector 386 through the integrated hub. The integrated hub allows multiple devices to be connected to the Ethernet port of the power and network panel 386. Technology 600 receives power through the power connector 630 by connecting integrated power cable 631. A USB cable 626 is connected to USB service port 629 and is integrated into cable routing channel 396 for easy access. All of the integrated cables and wires in the technology docking station 350 are routed through the cable routing channel 396.

Technology 600 is attached inside the technology docking station compartment 350 by any means known in the art to allow quick and easy removal such as removable clamps 634. By utilizing removable clamps 634, the technology 600 may be easily swapped for another technology when an improved version is available. To remove the technology 600, connectivity panel 352 is removed, any wires connected to the connectivity panel 352 are disconnected, the clamp 634 is released and any connectors attached to the technology 600 are disconnected. This allows the quick and easy swap of technologies.

The power station 346 comprises a power panel 337 which houses a power port 339a, a battery status monitor 339b, and a power switch 339c. Power port 339a is connected to the self-contained rechargeable power system 610 through power cable 332a routed through the cable routing channel 396. Battery status monitor 339b is connected to the self-contained rechargeable power system 610 through power cable 332b routed through the cable routing channel 396. Power switch 339c is connected to the self-contained rechargeable power system 610 through power cable 332c routed through the cable routing channel 396. Battery status monitor 339b displays the current battery state such as voltage, power, charge state, and temperature. Power switch 339c turns the self-contained rechargeable power system on or off, thereby turning on or off the power to the improved collaboration system 100. Alternatively, if a user chooses to elect an improved collaboration system 100 without the self-contained rechargeable power system 610, the power station 346 will be a blank panel.

The storage area 348 is located in-between the power station 346 and technology docking station 350. The storage area 348 allows items to be placed within the cavity when not needed. Additionally, the technology docking station 350 and power station 346 are recessed with enough clearance from the front access panel 342 to allow the power wires of external electronic devices connected to either station to travel into the storage area 348. Therefore, personal electronic devices plugged into connectivity panel 352 or power panel 337 may be stored in the storage area 348 and concealed by the front access panel 342.

Figure 5:
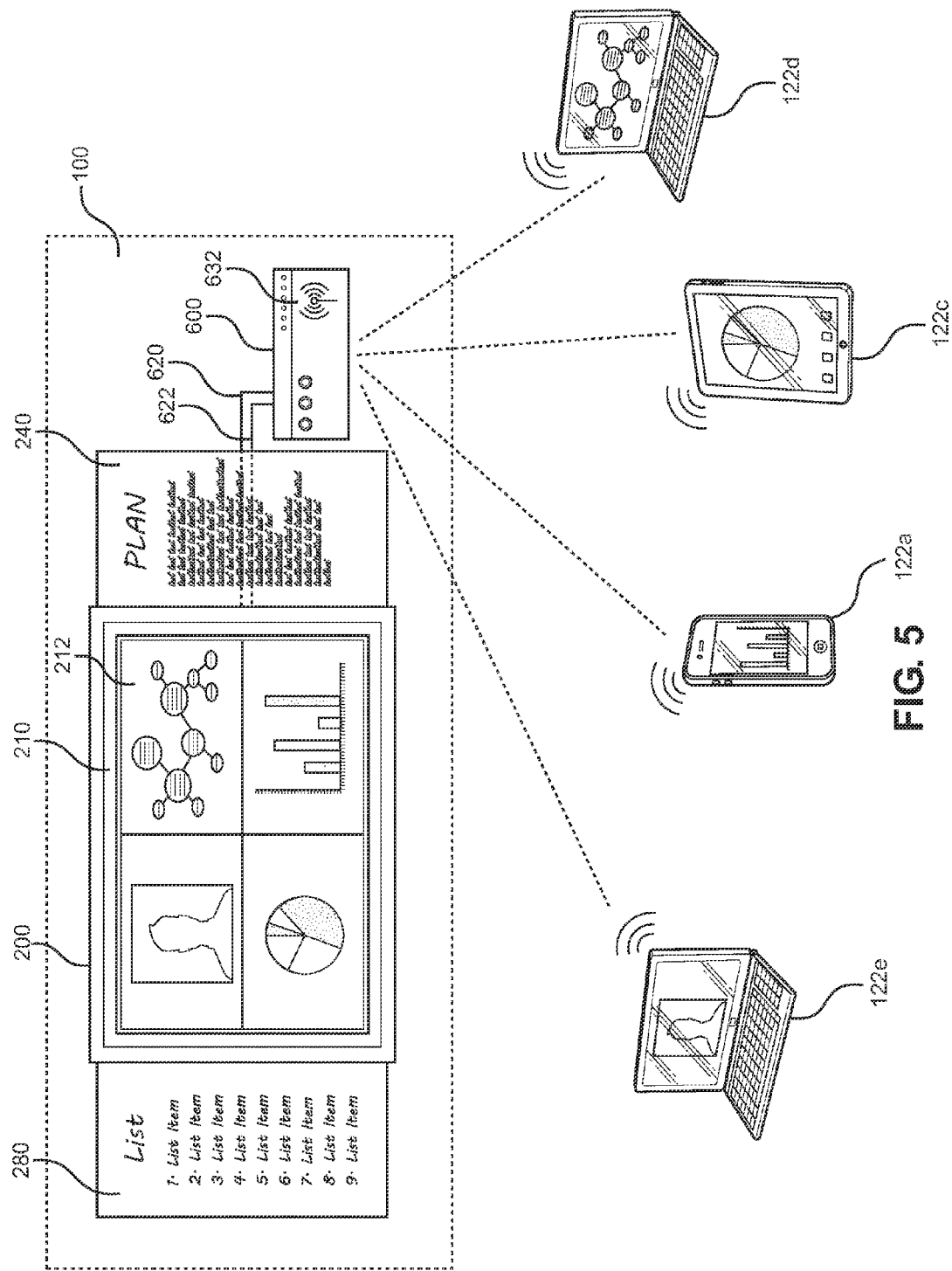
FIG. 5 is a schematic of the improved collaboration system with multiple personal electronic devices connected to the technology of the improved collaboration system and displayed on the display.

Referring now to FIG. 5, a schematic diagram of the improved collaboration system 100 represented as a dashed box with multiple personal electronic devices connected to the technology 600 is shown. An HDMI cable 620 and an audio cable 622 is connected from the technology 600 to the high definition monitor display 212 providing video and audio signals. The technology 600 has the ability to simultaneously display up to four personal devices at once; such as a smartphone 122a, a tablet 122c, a laptop 122d and a remote user 122e. Additionally, up to 32 simultaneous users may be connected to the technology allowing quick and easy access to the high definition monitor display 212 without the need for one user to disconnect while another is waiting to connect. Devices may be connected to the technology 600 wirelessly through the internal wireless antenna 632 or through the internet.

As shown, the display assembly 200 has high definition monitor display 212 showing four simultaneous presentations at once. The laptop 122d is wirelessly connected to the technology 600 and its screen content is shown on the high definition monitor display 212. The tablet 122c is wirelessly connected to the technology 600 and its screen content is also shown on the high definition monitor display 212 as well as the screen content of smartphone 122a. Remote user 122e is connected to the technology 600 through the internet and its content is shown on the high definition monitor display 212. Users connected to the technology 600 but not shown on the display may easily switch to the display with a touch of a button. With the ability to display multiple screens, multiple users may simultaneously share ideas, pictures, and presentations located on their personal electronic devices with ease.

Figure 6:
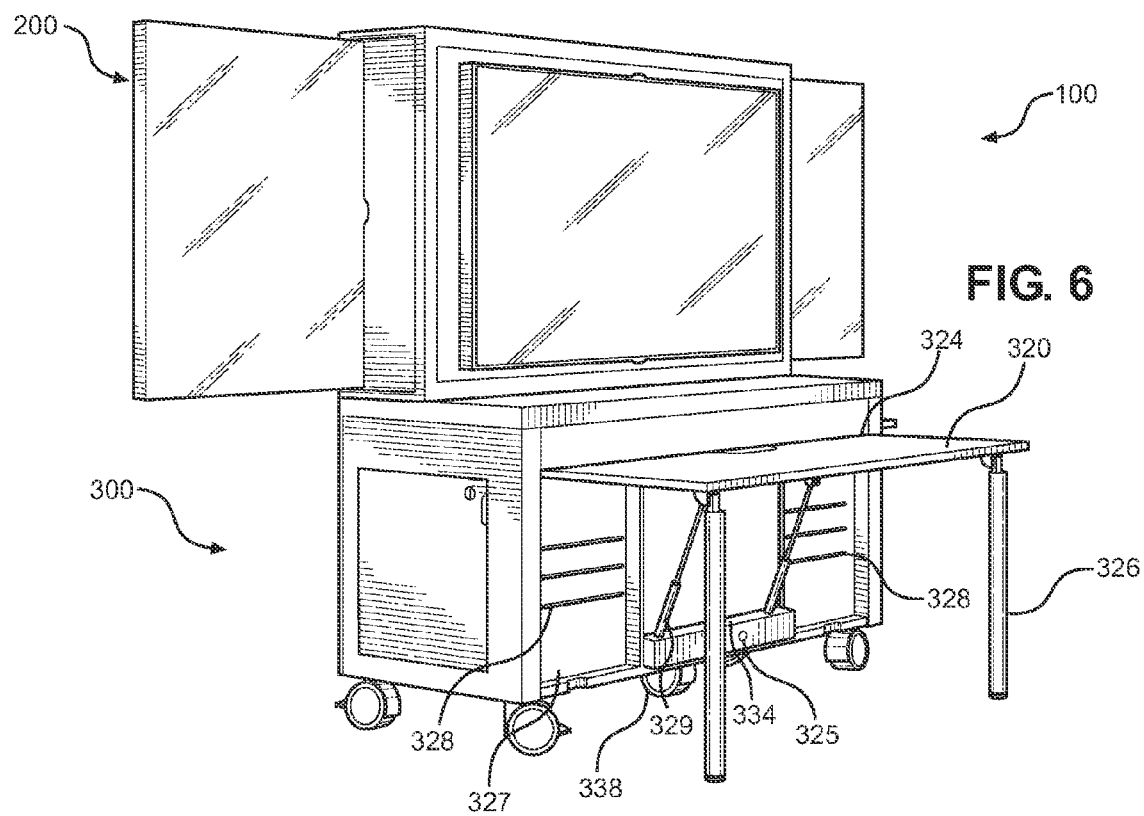
FIG. 6 is a view of the underside of partition one of the pull-out conference table showing a support member attached to partition two of the table and two hydraulic struts connected between the support member and partition one.

Referring now to FIG. 6, an isometric view of the improved collaboration system 100 is shown with partition one 320 open exposing a portion of the underside of conference table 310. In the open position, partition one 320 is supported by legs 326 and partition two 330 by hinge assembly 324. The support member 334 is constructed in a box like shape with a protrusion protruding normal to the surface of the support member 334 at the bottom to act as anchoring points for support struts 329 and a bump stop 325. To ease lifting partition one 320, hydraulic struts 329 are attached to the underside of partition one 320 and support member 334. Located on support member 334 is bump stop 325 which spaces partition one 320 a predetermined distance to allow the top surface 322 of partition one 320 to sit flush with the front wall 302 as well as absorb the shock of partition one 320 when closing. The interior of support member 334 is hollow and is utilized as additional storage area.

The front wall 302 of technology assembly 300 has a recess 327 with a predetermine size which accommodates the legs 326 and the thickness of partition one (1) 320 once collapsed in the closed position. The recess 327 has horizontal slots which comprises the front technology heat vents 328. The front technology heat vents 328 allow hot air trapped inside the technology assembly 300 to escape and cooler air to enter, keeping the technology 600 and self-contained rechargeable power system 610 at normal operating temperatures.

Figure 7:
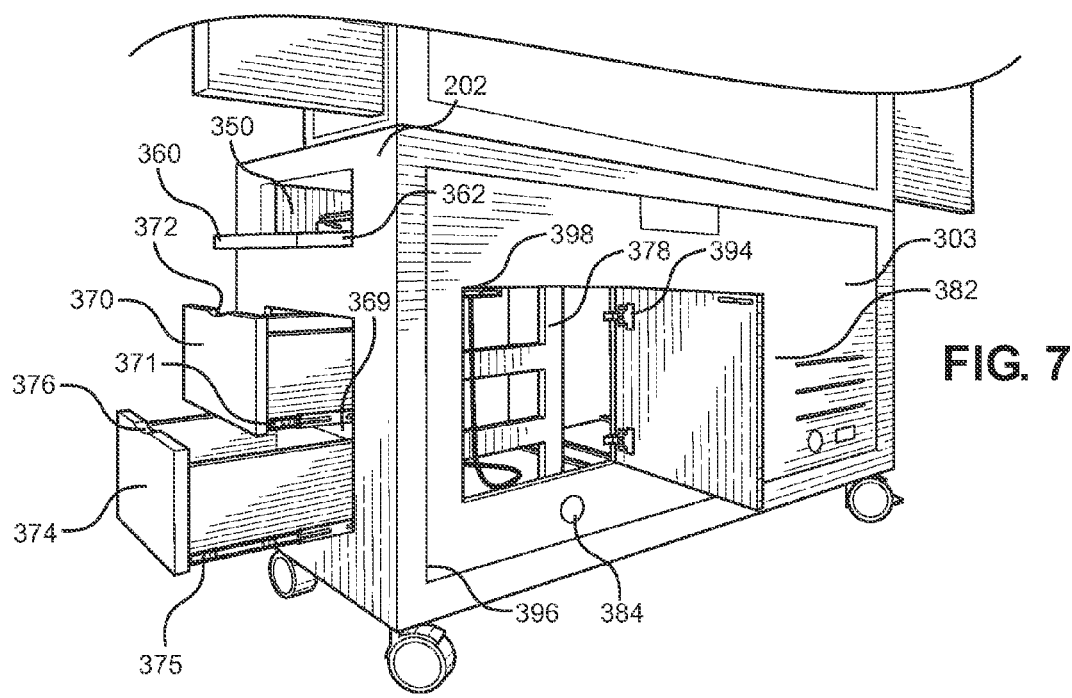
FIG. 7 is an isometric rear view of the improved collaboration system 100 is showing two drawers ajar and the right side technology dock access panel open allowing a user access to the technology being used.

Referring now to FIG. 7, an isometric view of the right rear side of the preferred embodiment is shown. The docking station access panel 360 is attached to right wall 304 through the use of hinges 362. The hinges 362 allow the docking station access panel 360 to pivot open and close. The docking station access panel 360 gives a user access to the docking station 350 for quick maintenance or repair of technology 600 and associated wiring without the need to remove connectivity panel 352.

Comprising the right wall 304 of the technology assembly 300 is a side docking station access panel 360 and drawer one 370 and drawer two 374. Drawer one 370 and drawer two 374 both have notches, 372 and 376 respectively.

The right wall 304 has a rectangular opening 369 to accommodate drawer one 370 and drawer two 374. The faces of the drawer one 370 and drawer two 370 are sized to fit inside of the rectangular opening 369 with minimal clearance. Drawer one 370 is attached to a drawer frame structure 378 within the technology assembly 300 by a pair of slide rails 371. Drawer two 374 is attached by a pair of slide rails 375 to the drawer frame structure 378 as well. As shown, the drawer support frame 378 is created from a plurality of horizontal and vertical disposed wooden members rigidly connected to the interior of the technology assembly 300. The support frame 378 has large open spaces which, when drawer one 370 and drawer two 374 is ajar, gives a user access to more room within the interior of the technology assembly 300 to work, such as installing, adjusting and taking out cables, power cords, adapters, power bars, and Ethernet cables.

The rear access panel 382 is a rectangular portion of the rear wall 303 cut and hingedly reattached at one end. The hinge 394 creates a vertical axis of rotation, allowing the rear access panel to pivot open and close.

At the intersection of rear wall 303 and right wall 304, lower routing port 398 (shown in FIG. 4) allows the routing channel 396 to extend from the technology docking station 350 into the bottom of the technology assembly 300 as illustrated. The cable routing channel 396 has access to the power system 610 through the lower routing port 398. Located at the bottom corner of rear wall 303 are the power and network connector panel 386 and a plurality of grommet holes 384. The integrated hub of the cable routing channel 396 is attached to the power and network connector panel 386 and allows the improved collaboration system 100 to connect through hard wire to a buildings existing network. Power cables are attached to the power and network connector panel 386 allowing the improved collaboration system 100 to receive external power source such as an electrical wall outlet when a power cord is connected to the power and network connector panel 386 and the electrical wall out. Network cables attached to the power and network connector panel 386 allows the improved collaboration system 100 to connect through a hard wire to a buildings existing network.

Figure 8:
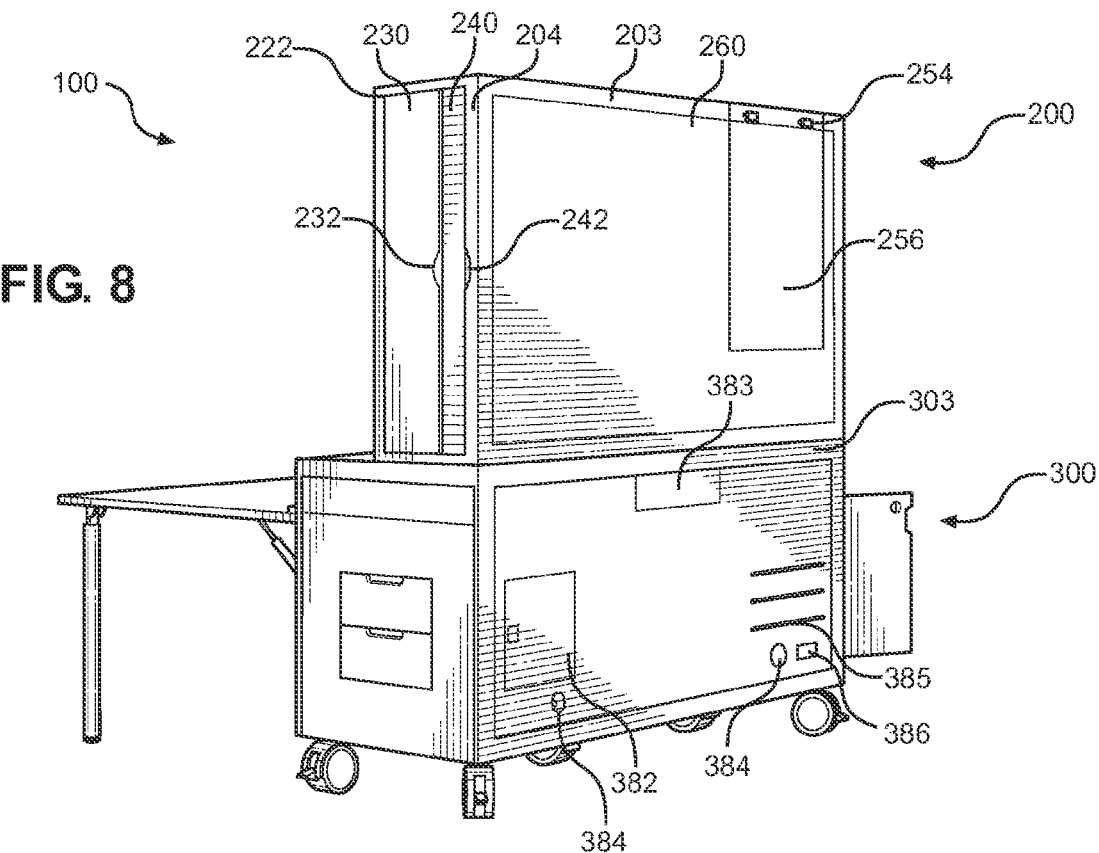
FIG. 8 is an isometric rear view of the improved collaboration system 100 showing the right side wall and rear wall.

Referring now to FIG. 8, an isometric rear view of the improved collaboration system 100 is shown. The rear wall 203 of the display assembly 200 comprises a rear display panel 260 and pegs 254. The rear display panel 260 is similarly attached to the rear wall 203 as the front display panel 210 is attached to the front wall 202. In this preferred embodiment, a whiteboard material is used for the rear display panel 260 to allow users to use the rear display panel 260 as a writing surface. The rear display panel 260 is removable to allow access to the interior of the display assembly to install, remove, or maintain the high definition monitor display 212 and the integrated wires and cables. Additionally, the rear display panel 260 may support additional monitors if the user wishes, giving the improved collaboration system 100 the ability to be used by two collaborative groups at the same time. The pegs 254, or any means of attachment, are used to attach external writing equipment such as a large paper pad, display board, or poster board 256. This allows a user to use prepared visual aids as presentation material when needed.

The rear wall 303 of technology assembly 300 consists of a rear access panel 382, a rear cable routing access panel 383, a power and network connector panel 386, and a plurality of grommet holes 384. The rear access panel 382 is hingedly attached to the rear wall 303 and allows pivoting of the rear access panel 382. The access panel 382 pivots open, giving users access to the interior of the technology assembly 300. The rear cable routing access panel 383 is hingedly attached to the rear wall 303 and allows pivoting of the rear access panel open, giving users access to the cable routing channel 396.

Located near the bottom of the rear wall 303, is the power and network connector panel 386. The power and network panel 386 provides connectors for external power and external network connections when needed. A plurality of grommet holes 384 is located near the bottom of rear wall 303. Located on the right side of rear wall 303 is a rear heat vent 385 comprised of a plurality of slots. The heat vent 385 allows built up heat from the technology 600 and power system 610 to escape from the interior of the technology assembly 300.

The right wall 204 of the display assembly 200 comprises a right side access panel 230 and an extendable display panel 240 and is similar to left wall 203. The right side access panel 230 is attached to the right wall 204, which acts as a support frame, by hinges 222 which allow pivoting. The right side access panel 230 rotates along the vertical axis created by hinges 222 from a closed position, which is substantially parallel to the right wall 204 to the open position which is at an angle greater than 90 degrees to the right wall 204. When open, the right side access panel 230 exposes the interior cavity of the display assembly 200. A notched segment 232 in the right side access panel 230 allows users to easily open the right side access panel 230 without the need for protruding hardware. Located next to the right side access panel 230 is the extendable display panel 240. The extendable display panel 240 is attached to the display assembly 200 with linear slides allowing the display panel 240 to move linearly along a straight line into or out of the display assembly 200. A notch 242 in the frame created by the right side wall 204 allows the user to easily grasp the extendable display panel 240.

The rear wall 203 of the display assembly 200 comprises a rear display panel 260 and pegs 254. The rear display panel 260 is similarly attached to the rear wall 203 as the front display panel 210 is attached to the front wall 202. The rear display panel 260 is made from a similar material as well. Additionally, the rear display panel 260 is removable to allow access to the interior of the display assembly 200 to install, remove, or maintain the high definition monitor display 212 and integrated wires and cables. In this preferred embodiment, in order to provide additional utility and cost-effectiveness of this invention, a whiteboard material is used for the rear display panel 260 to allow users to use the rear display panel 260 as a writing surface. Additionally, the rear display panel 260 may support additional monitors if a user wishes, giving the improved collaboration system 100 the ability to be used by two collaborative groups at the same time. The pegs 254, or any means of attachment such as clips or pins, are used to attach external writing equipment such as a large paper pad, display board, or poster board. This allows a user to use prepared visual aids as presentation material when needed.

The rear wall 303 of technology assembly 300 consists of a rear access panel 382, a rear cable routing access panel 383, a power and network connector panel 386, and a plurality of grommet holes 384. The rear access panel 382 is hingedly attached to the rear wall 303 and allows pivoting of the rear access panel 382. The access panel 382 pivots open, giving users access to the interior of the technology assembly 300. The rear cable routing access panel 383 is hingedly attached to the rear wall 303 and allows pivoting of the rear access panel open or close, giving users access to the cable routing channel 396.

Located near the bottom of the rear wall 303, is the power and network connector panel 386. The power and network panel 386 provides connectors for external power and external network connections when needed. By using connectors in place of interconnected cables, it removes the protrusion of the cables which may be damaged. A plurality of grommet holes 384 is located near the bottom of rear wall 303. Located on the right side of rear wall 303 is a rear heat vent 385 comprised of a plurality of slots. The heat vent 385 allows built up heat from the technology 600 to escape from the interior of the technology assembly 300.

Figure 9:
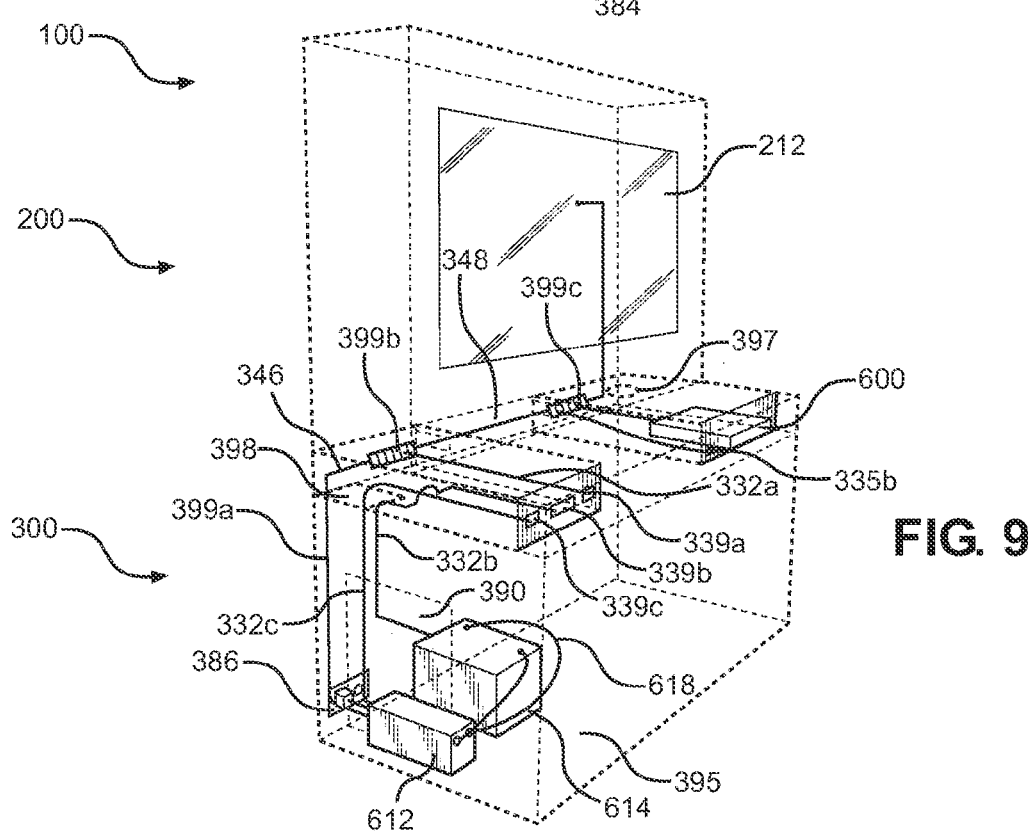
FIG. 9 is a perspective line drawing of preferred embodiment of the present invention, the improved collaboration system 100 representing the overall diagrammatic view of the integrated electronic components and the associated electrical wiring.

Referring now to FIG. 9, a perspective line drawing of preferred embodiment of the present invention, the improved collaboration system 100 is shown. The perspective line drawing represents the overall diagrammatic view of the major electronic components of the present invention and their associated electrical wiring. As shown, the power inverter 612 and battery 614 of the self-contained rechargeable power system 610 is located in cavity 395 of the technology assembly 300. Battery connectivity cables 618 connect power inverter 612 to the battery 614. The power inverter 612 is connected to the power and network connector panel 386. The power and network connected panel 386 plugs into an electrical wall outlet to provide the inverter with an external source of power. The power inverter 612 has the option to run off of battery power 614 or from the electrical wall outlet of a building.

The access door 390 conceals the power system 610 from view as well as allows a user to open the access door 390 to perform maintenance. Alternatively, the cavity 395 may be used as additional storage area, removing the self-contained rechargeable power system 610. By removing the self-contained rechargeable power system 610, users have the option of choosing a cheaper alternative when they do not need the improved collaboration system 100 to be independent of an electrical socket.

A power line 399a is integrated in the cable routing channel 396 and provides power to the improved collaboration system 100. The power line 399a is connected to the power inverter 612 and runs through the cable routing channel 396 into the power station compartment 346. This allows the improved collaboration station 100 to run off of battery 614 or from an electrical wall outlet of a building. Alternatively, if a user opts to not have the self-contained rechargeable power system 610, power line 399a will directly connect to power and network connector panel 386, providing 399a with direct electrical power from a building's electrical outlet.

In the power station compartment 346, the power line 399a is split into a power distribution panel 399b, such as a surge protector or a power strip, to provide access to power. The power port 339a is connected to the power distribution panel 399b through power cable 332a. The battery status monitor 339b is connected to power cable 332b integrated into the cable routing channel and runs through the lower routing port 398 to the battery 614. The battery status monitor 339b is directly connected to the battery 614 and provides and displays the current battery state such as voltage, power, charge state, and temperature. Power switch 339c is connected to power cable 332c integrated into the cable routing channel 396 and runs through the lower routing port 398 to connect to the power inverter 612. Power switch 339c turns the self-contained rechargeable power system on or off, thereby turning on or off the power to the improved collaboration system 100.

The power line 339a is then routed through the cable routing channel 396 through the storage area compartment 348 and into the technology docking station compartment 350. The power line 339a branches into power distribution panel two 399c. Technology 600, located in the technology docking station 350 which is in the upper-right corner of the technology assembly 300, is connected to the power distribution panel two 399c for power through power cable 631. Connectivity port 335b is connected to the power distribution panel two 399c for its power connections through power cable 631 as well.

The high definition display monitor 212 is connected to power distribution panel 339b for its power needs. A power wire is connected to power distribution panel two 399b and travels through the upper routing port 397 form the technology docking station compartment 350 into the interior of the display assembly 200 and connected to the high definition display monitor 212.

Figure 10:
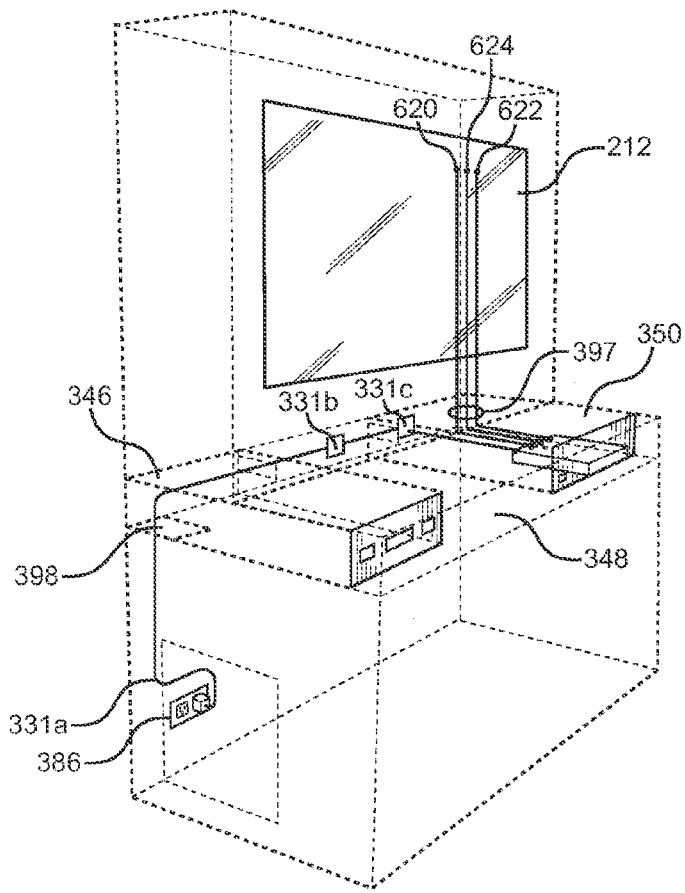
FIG. 10 is a perspective line drawing of preferred embodiment of the present invention, the improved collaboration system 100 showing the overall diagrammatic view of the integrated electronic components and the associated network, audio, and video wiring.

Referring now to FIG. 10, a perspective line drawing of preferred embodiment of the present invention, the improved collaboration system 100 is shown. The perspective line drawing represents the overall diagrammatic view of the major electronic components of the present invention and their associated network, audio, and video wiring. The diagram shows the cable and wire routing paths as well as the relative locations of the integrated technology utilizing network, audio, and video wiring.

A network cable 331 a is connected to the power and network connector panel 386 and provides the improved collaboration system 100 a hard wire connection to a building's existing Ethernet network. The network cable 331a is integrated into the cable routing channel 396 and travels along the cable routing channel 396. The network cable 331a travels into the power station compartment through the lower routing port 398. The network cable 331a then travels into the storage area compartment 348 in which the network cable 331 branches into a hub 331b. The hub 331b allows external technology to connect to a building's existing Ethernet network through the improved collaboration system 100. The network cable 331a then travels into the technology docking station compartment 350 and branches further into hub two 331c. The technology 600 located in the technology docking station compartment 350 is connected to hub two 331c to provide the option to connect the technology 600 to a building's existing network through a hard wire in circumstances where wireless access does not exist.

Technology 600 connects to high definition monitor display 212 through the use of HDMI cable 620 connected to HDMI output 621 or through VGA cable 624 connected to the VGA output 625. The HDMI cables 620 and VGA cables 624 are integrated into the cable routing channel 396 and travels up to the high definition monitor display 212 through the upper routing port 397. An audio cable 622 is also prewired in the cable routing channel 396 and can connect the audio output 621 to built-in speakers in the monitor display 212.

Figure 11:
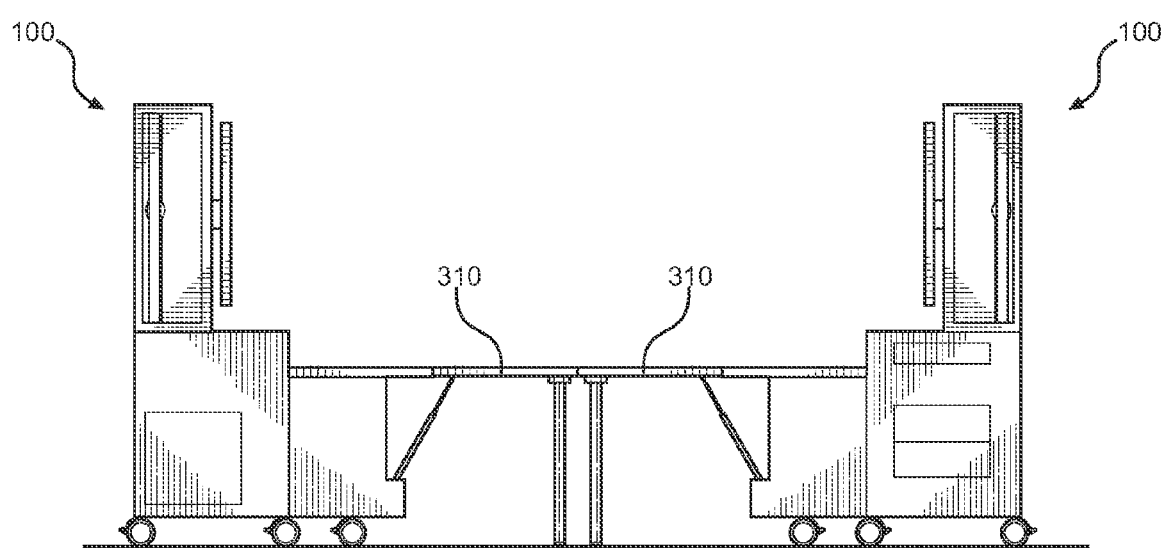
FIG. 11 is a side view of two improved collaboration systems facing front-to-front, creating a larger collaboration system.

Referring now to FIG. 11, two preferred embodiments of the present invention 100 are used cooperatively to form a larger collaboration system is shown. The improved collaboration system 100 allows multiple units to be linked together to form a larger improved collaboration system. As shown, the improved collaboration system 100 is linked together by placing table 310 of each system together, face-to-face. This allows a meeting to be conducted between two remote users, one per improved collaboration system 100, as they video conference among themselves and with other users sitting around the pull-out conference table 310. It is also recognize by those skilled in the art that other variations in which the improved collaboration system 100 may be linked are possible, such as side-by-side or back-to-back.

Figure 12:
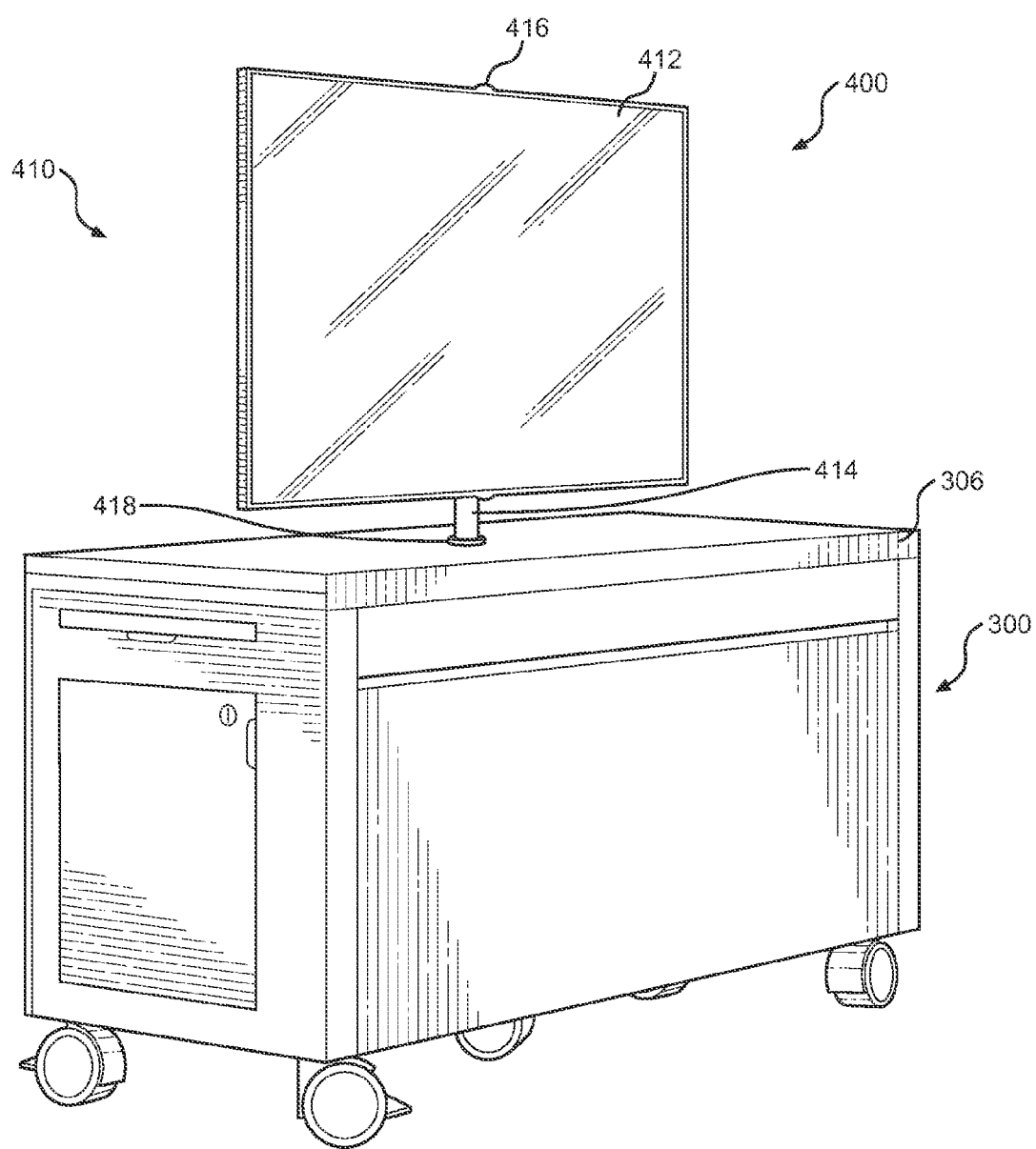
FIG. 12 is an isometric view of alternative embodiment of the present invention showing a simplified display assembly attached to the top surface of technology assembly.

Referring now to FIG. 12, an alternative embodiment of the present invention is shown and designated 400. As shown, the improved collaboration system 400 comprises a technology assembly 200 and a simpler version of the display assembly 410. The technology assembly 200 is substantially the same as in the preferred embodiment shown in FIG. 1. The display assembly 410 however is much simpler, allowing users the opportunity to choose a cheaper option. As shown, the display assembly 410 consists of a single high definition display monitor 412 attached at an attachment point 416 to a support pillar 414 in which multiple surfaces or displays may be attached. The support pillar 414 is mounted to the top wall 306 of the technology assembly 300 using a mounting plate 418.

Figure 13:
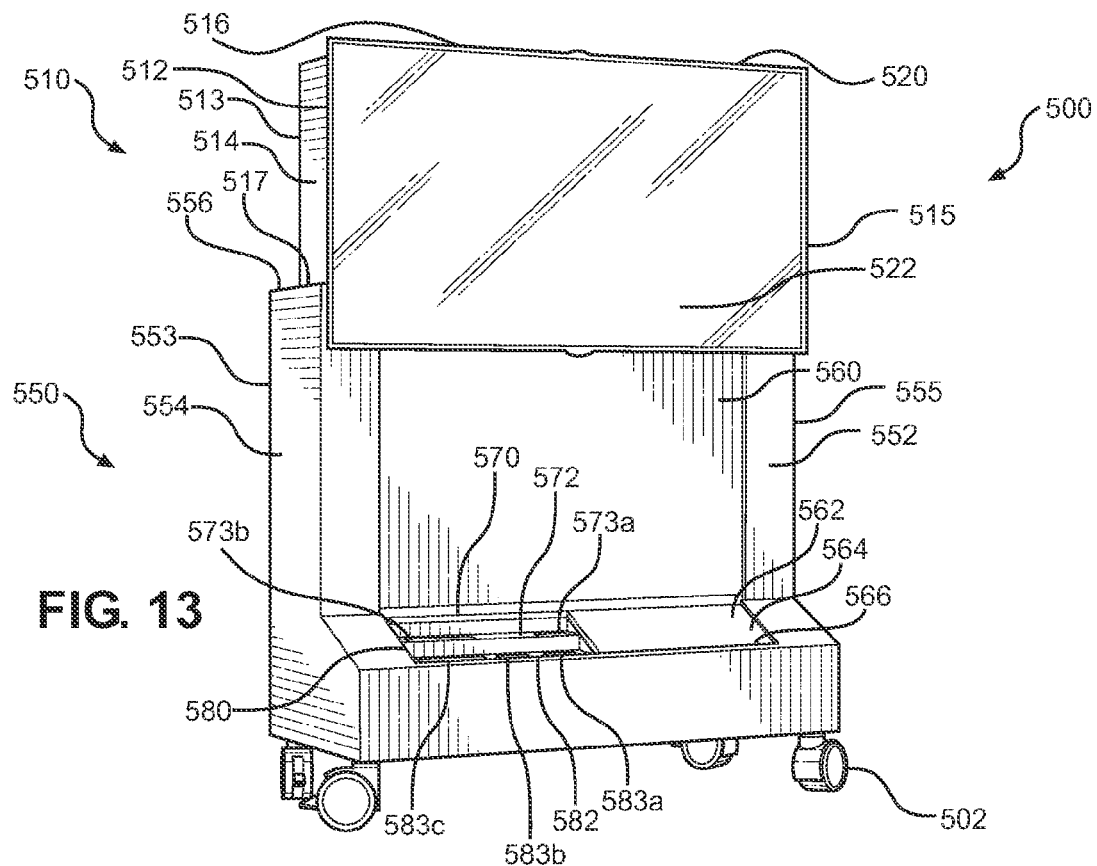
FIG. 13 is an isometric view of alternative embodiment of the present invention showing a low-cost and compact improved collaboration system with corresponding compact display and technology assembly.

Referring now to FIG. 13, an isometric front view of an alternative embodiment of the present invention is shown and designated 500. The alternative embodiment of the improved collaboration system 500 illustrated is a low-cost alternative to the preferred embodiment of FIG. 1.

As shown, the improved collaboration system 500 comprises a display assembly 510 and technology assembly 550. The display assembly 510 is of boxlike construction and comprises generally parallel and vertically extending right 515 and left 514 side walls which are rigidly and perpendicularly joined to generally vertical enlarged front wall 512 and rear wall 513 creating an open box with equal vertical walls. The top 516 and bottom 517 walls are rigidly connected to form a closed box. The technology assembly 550 is of boxlike construction and comprises a boxed frame with a front 552, rear 553, right 555, left 554, top 556 and bottom 557 wall joined together similarly to display assembly 510.

The display assembly 510 is oriented adjacent to the top of technology assembly 550 such that the bottom wall 517 of display assembly 510 is in contact with the top wall 556 of the technology assembly 550 and the front walls 515 and 555 are in the same plane. Located on the underside of technology assembly 550 are four (4) heavy duty locking wheels 502 attached to the bottom wall 557. Each wheel 502 is located at a corner of the bottom wall 557 of the technology assembly 550 to provide the mobility to transport the improved collaboration system. The small footprint of the improved collaboration system 500 enables it to be easily transported to more locations with smaller areas.

A high definition display monitor 522 is attached to the front wall 512 of the technology assembly 510 by attachment plate 520. The front wall 552 of the technology assembly 550 provides a frame in which display panel 560 is inserted and attached. Display panel 560 extends up into the front wall 512 of the display assembly 510. The front wall 512 also provides a frame in which display panel 560 is inserted and attached. In this preferred embodiment, in order to provide more utility and in turn cost-effectiveness, a whiteboard structure is used for display panel 560. This allows users to use the area of the display panel 560 not covered by the high definition display monitor 522 as a work surface to write.

Located below the display panel 560 is a technology docking and storage area 562. The technology docking and storage area 562 is a box like structure protruding from the front wall 552. The left, right, and bottom walls of the technology docking and storage area 562 are aligned in the same plane as the left wall 554, right wall 555, and bottom wall 557 of the technology assembly, respectively. An access panel 564 covers the top opening of technology docking and storage area 562. A system of races 566 hold access panel 564 in place and allows access panel 564 to slide back and forth, allowing a user to access the technology and docking storage area 562.

The technology docking and storage area 562 is partitioned into three zones: power station 580, storage area 562, and technology docking station 570. A cable routing channel 596 (not shown) is located towards the bottom of the technology docking and storage area 562 to accommodate the compact structure of the improved collaboration system 500. The technology docking station 570 and power station 580 is substantially similar to the technology docking station 350 and power station 346 of the improved collaboration system 100 of FIG. 1.

The technology docking station 570 is covered by a removable connectivity panel 572. The technology docking station 570 houses the technology 600 used in the preferred embodiment 100 of FIG. 1 which interfaces users to the improved collaboration system 500. Users may connect their personal electronic devices (such as a laptop, tablet, or smartphone) to the technology 600 either through wireless connection, internet connection, or hard wire. Once connected to the technology 600, the user has the ability to control the high definition display monitor 522 and display what is showing on their personal electronic device. Technology 600 allows multiple users to be displayed simultaneously on the high definition display monitor 522 and allows even more to be connected at once.

The connectivity panel 572 is substantially similar to connectivity panel 352 of preferred embodiment 100 of FIG. 1 and houses a technology display port 573*a* and a connectivity port 573*b*. Technology display port 573*a* is a rectangular opening in the connectivity panel 572 with a predetermined size based on the front display panel of technology 600. Through the opening, the display port 573*a* displays the front display panel of technology 600. Connectivity port 573*b* allow users to connect to technology 600 through hard wire if a device is not wireless (Wi-Fi) capable and connect to electrical wall outlet though the improved collaboration system 100.

The power panel 582 of the power station 580 allows users to connect external electronic devices requiring power to a self-contained rechargeable power system 610 (not shown) contained in the interior of the technology assembly 550 of the improved collaboration system 500. The self-contained rechargeable power system 610 is similar to the self-contained rechargeable power system 610 in the preferred embodiment 100 shown in FIG. 1 and comprises an inverter 612 and a battery 612 and associated wiring. The battery 614 can provide up to 100 Ah which will power the improved collaboration system for approximately 5 hours. The self-contained rechargeable power system 610 allows the improved collaboration system 500 to be truly mobile, removing the need to be connected to an electric wall socket for its power needs for an extended period of time.

The power panel 582 is substantially similar to power panel 337 of the preferred embodiment 100 of FIG. 1 and houses power port 583*a* and battery status monitor 583*b*, and a power switch 583*c*. The storage area 562 is located to the right of the power station 580 and technology docking station 570. The storage area allows items to be placed within the cavity when not needed. Enough clearance is between the access panel 564 to allow the charging cables of electronic devices to pass through, allowing items placed in the storage area to be charge.

In an alternative embodiment in which a user elects to have the improved collaboration station 500 without the self-contained rechargeable power system 595 to save on cost, the power panel 582 will be a blank panel.

Figure 14:
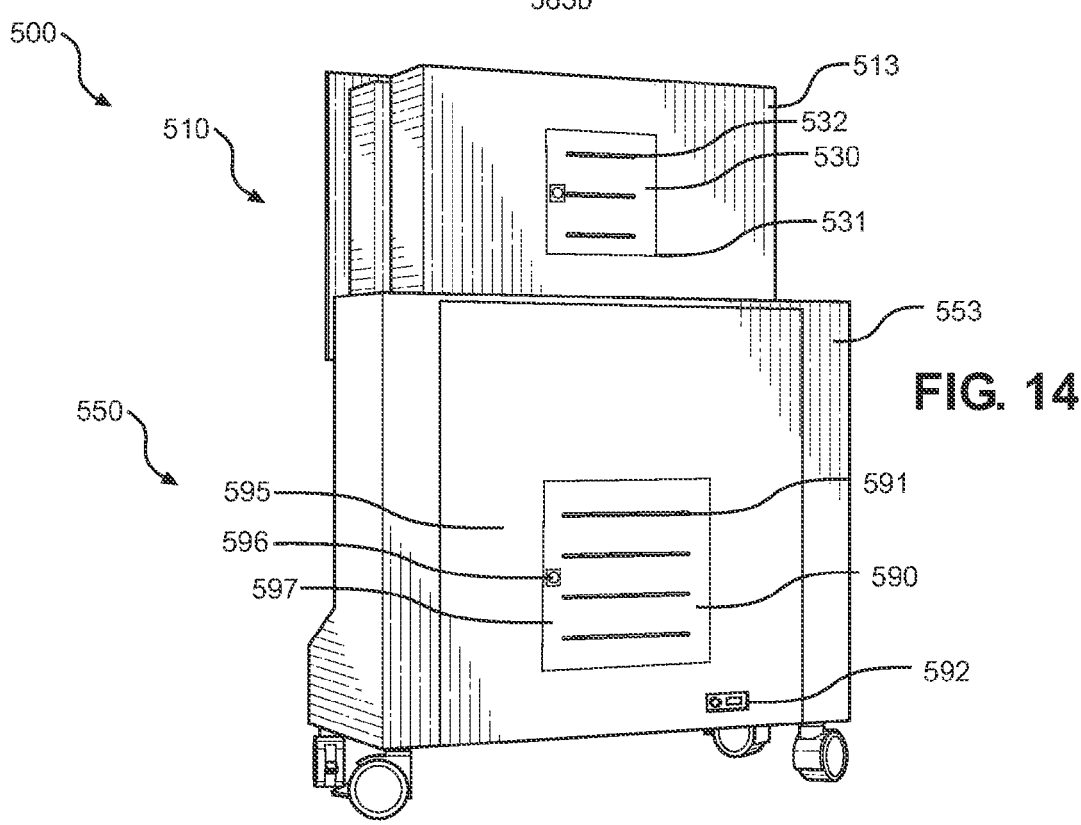
FIG. 14 is a rear isometric view of alternative embodiment of the present invention showing a low-cost and compact improved collaboration system with corresponding compact display and technology assembly.

Referring now to FIG. 14, a rear isometric view of the improved collaboration system 500 is shown. The display assembly 510 is of a smaller dimension compared to the technology assembly 550. The display assembly 510 is attached on top and adjacent to the 550 and the right, left, and rear walls of the display assembly 510 are offset from the technology assembly walls.

The rear wall 513 has display assembly access panel 530 hingedly attached to allow the display assembly access panel 530 to pivot open and closed on the vertical axis created by the hinge 531. The access panel 530 has vent holes 532 to allow heat to escape from the interior cavity. When open, the access panel 530 exposes the interior cavity of the display assembly 510. The user may then access the cable routing channel 596 and the high definition monitor display 522 to make repairs or conduct maintenance.

The rear wall 553 of technology assembly 550 consists of a rear access panel 590 and a power and network connector panel 592. The rear access panel 590 is hingedly attached to the rear wall 553 and allows pivoting of the rear access panel 590. The rear access panel 590 pivots open, giving users access to the interior of the technology assembly 550. The self-contained rechargeable power system 610 (not shown) is contained in the interior of the technology assembly 550 of the improved collaboration system 500. By opening the rear access panel 590, a user has access to the self-contained rechargeable power system 610 to perform maintenance or make repairs.

Located near the bottom of the rear wall 553, is the power and network connector panel 592. The power and network connector panel 592 provides connectors for external power and external network connections when needed. The power and network connector panel 592 is minimally intrusive as it protrudes only slightly. By using connectors in place of interconnected cables, it removes the protrusion of the cables which may be damaged.

I claim:
1. An improved collaboration system comprising:
   a technology assembly having a base, an integrated pull-out table recessed within said base, a technology docking station, and a plurality of wheels attached to said base;
   a display assembly connected to said technology assembly and having a monitor display electrically connected to said technology docking station, wherein said technology docking station provides a point of connection to connect a plurality of external systems to said monitor display.

* * * * *